United States Patent
Dionne

(10) Patent No.: US 11,637,639 B2
(45) Date of Patent: *Apr. 25, 2023

(54) PASSIVE NOISE DAMPENERS

(71) Applicant: Charter Communications Operating, LLC, St. Louis, MO (US)

(72) Inventor: Michael David Dionne, Nederland, TX (US)

(73) Assignee: Charter Communications Operating, LLC, St. Louis, MO (US)

(*) Notice: Subject to any disclaimer, the term of this patent is extended or adjusted under 35 U.S.C. 154(b) by 0 days.

This patent is subject to a terminal disclaimer.

(21) Appl. No.: 17/882,880

(22) Filed: Aug. 8, 2022

(65) Prior Publication Data

US 2022/0376724 A1 Nov. 24, 2022

Related U.S. Application Data

(63) Continuation of application No. 17/320,290, filed on May 14, 2021, now Pat. No. 11,476,953.

(51) Int. Cl.
*H01Q 23/00* (2006.01)
*H01Q 9/04* (2006.01)
(Continued)

(52) U.S. Cl.
CPC .............. *H04B 15/00* (2013.01); *H01Q 3/34* (2013.01); *H01Q 17/001* (2013.01); *H04B 1/12* (2013.01); *H04B 7/155* (2013.01)

(58) Field of Classification Search
CPC ... H04B 1/10; H04B 1/12; H04B 3/20; H04B 3/34; H04B 7/155; H04B 15/00;
(Continued)

(56) References Cited

U.S. PATENT DOCUMENTS 3,719,904 A 3/1973 Bragg
5,606,734 A 2/1997 Bahu
(Continued)

FOREIGN PATENT DOCUMENTS

AU 2016203171 A1 6/2016
JP 2005203821 A 7/2005

OTHER PUBLICATIONS

Gwyn Griffiths, Radio Enthusiast, "HF Band Passive Noise Cancellation", Practical Wireless, Sep. 2018, https://www.radioenthusiast.co.uk/news/hf-band-passive-noise-cancellation/.

*Primary Examiner* — Blane J Jackson
(74) *Attorney, Agent, or Firm* — Young Basile Hanlon & MacFarlane, P.C.

(57) ABSTRACT

Methods and systems for a passive noise dampener. A system includes a hybrid fiber-coaxial network which carries content signals between a service provider system and premises, where the hybrid fiber-coaxial network is susceptible to receiving wireless noise signals, a plurality of passive noise dampeners, each passive noise dampener connected between the hybrid fiber-coaxial network and a premise of the premises. Each passive noise dampener includes an antenna based on medium used in the hybrid fiber-coaxial network. The antenna receives the wireless noise signals. A phase shifting device phase shifts 180 degrees phase shift the wireless noise signals received by the antenna to generate a counter signal. A directional coupler injects the counter signal into the hybrid fiber-coaxial network to mitigate impact of the wireless noise signals received by the hybrid fiber-coaxial network on the content signals. The antenna, the phase shifting device, and the directional coupler are passive devices.

20 Claims, 4 Drawing Sheets

(51) Int. Cl.
  *H04B 1/10* (2006.01)
  *H04B 15/00* (2006.01)
  *H01Q 17/00* (2006.01)
  *H01Q 3/34* (2006.01)
  *H04B 1/12* (2006.01)
  *H04B 7/155* (2006.01)

(58) Field of Classification Search
  CPC .......... H04B 23/00; H04B 7/15; H01Q 17/00;
    H01Q 17/001; H01Q 3/34; H01Q 9/04;
    H01Q 23/00
  See application file for complete search history.

(56) References Cited

U.S. PATENT DOCUMENTS

| | | | |
|---|---|---|---|
| 9,054,782 B2 * | 6/2015 | Hunter | ............. H04B 3/46 |
| 2005/0068223 A1 | 3/2005 | Vavik | |
| 2005/0069063 A1 * | 3/2005 | Waltho | ............. H04B 1/525 |
| | | | 375/346 |
| 2006/0248565 A1 | 11/2006 | Shimp et al. | |
| 2019/0296791 A1 | 9/2019 | Walley et al. | |

* cited by examiner

PASSIVE NOISE DAMPENERS

CROSS REFERENCE TO RELATED APPLICATION

This application is a continuation of U.S. patent application Ser. No. 17/320,290, filed on May 14, 2021, of which is incorporated herein by reference.

TECHNICAL FIELD

This disclosure relates to telecommunications systems. In particular, the disclosure is for a passive noise dampener for use in a coaxial cable network to mitigate interfering radio frequency (RF) signals or wireless radio signals.

BACKGROUND

Hybrid fiber-coaxial (HFC) networks including, for example, HFC Data Over Cable Service Interface Specification (DOCSIS) networks, use taps and drops to demarcation points to connect subscriber premises or houses to the HFC network to supply content or media signals to subscribers. Within the HFC network interfering RF or wireless radio signals ("noise") can cause degradation of services across the system, and in particular at a subscriber's premises. There are two types of noise that can affect coaxial cable systems or networks such as HFC networks. These two types are constant noise and impulse noise. Constant noise is normally at a lower frequency and at a constant amplitude. For example, FM radio station signals are a type of constant noise. Constant noise can be relatively easily located and measured. Impulse noise is usually wideband (affects a large number of frequencies) and at a high amplitude over a short period of time. For example, cell phone signals are a type of impulse noise. Impulse noise is difficult to measure and locate in comparison to constant noise. In addition, impulse noise is more detrimental than constant noise with respect to service signal degradation.

Solutions for this problem can include replacement of damaged or non-conforming coaxial cable lines or installation of expensive actively powered noise canceling devices. For example, the latter solutions cancel or dampen noise by using computed error rates to adjust the amplitude (or "strength") of the canceling or dampening signal. This is necessary because these devices use a radio antenna which receives radio frequencies at a higher amplitude than that of the shielded coaxial cable line. Due to electrical requirements and the cost of these computer components, most service providers forgo utilizing these devices because it is more cost effective to pay for the parts and labor to find and replace the offending coaxial cable, splitters, and fittings. This method of locating and replacing places a heavy stain on the service provider's field operations as the time needed to locate radio signal leaking into the coaxial cable system demands a significant investment of personnel.

SUMMARY

Disclosed herein is a passive noise dampener for closed coaxial cable systems.

In implementations, a system includes a hybrid fiber-coaxial network configured to carry content signals between a service provider system and premises, where the hybrid fiber-coaxial network is susceptible to receiving wireless noise signals, a plurality of passive noise dampeners, each passive noise dampener connected between the hybrid fiber-coaxial network and a premise of the premises. Each passive noise dampener includes an antenna based on medium used in the hybrid fiber-coaxial network, the antenna configured to receive the wireless noise signals, a phase shifting device configured to 180 degrees phase shift the wireless noise signals received by the antenna to generate a counter signal, and a directional coupler configured to inject the counter signal into the hybrid fiber-coaxial network to mitigate impact of the wireless noise signals received by the hybrid fiber-coaxial network on the content signals, where the antenna, the phase shifting device, and the directional coupler are passive devices.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
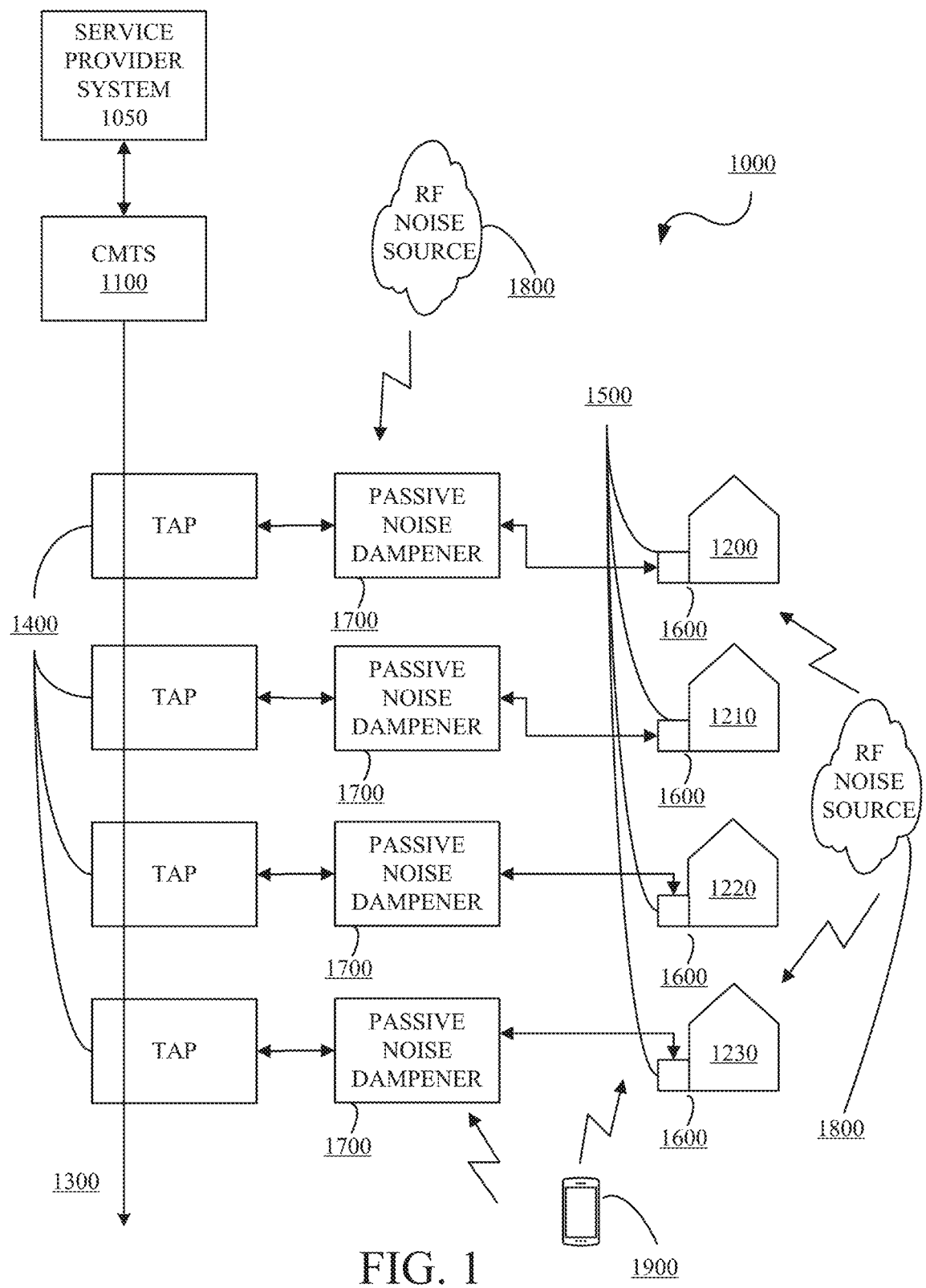
FIG. 1 is a diagram of an example network with passive noise dampeners in accordance with embodiments of this disclosure.

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, compositions and methods. Those of ordinary skill may thus recognize that other elements and/or steps may be desirable or necessary to implement the devices, systems, compositions and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Described herein are methods and devices for passive noise dampening in a closed coaxial cable network. In implementations, a passive noise dampener or passive interference mitigation device receives a signal using a coaxial cable based antenna, inverts a phase of the signal by 180 degrees to output a counter signal, and injects the counter signal for combination with the service signal and noise signal. The antenna is a passive device. The counter signal is at constantly lower amplitude than the noise signal therefore mitigating or preventing service signal issues due to the noise signal. The intentionally introduced counter signal can lessen the effects of both constant and impulse noise signals.

In implementations, the passive noise dampener can include an antenna which has a core consisting of the same medium as the coaxial cable network and passive devices to phase shift the received signal from the antenna and combine the phase shifted signal with the coaxial cable network signal. The phase shifted signal is a complementary signal at a lower amplitude relative to the received signal. The all passive device provides a low cost solution (relative to expensive active devices) which can be provided or provisioned at every subscriber's premises at or near the point of demarcation to prevent loss and/or degradation of services.

FIG. 1 is a diagram of an example network 1000 with passive noise dampeners in accordance with embodiments of this disclosure. In implementations, the network 1000 can include a cable modem termination system (CMTS) 1100 via which a service provider 1050 can provide cable, television, Internet, voice, and like services to premises, residences, offices, and the like (collectively "premises") such as, for example, premises 1200, 1210, 1220, and 1230. The CMTS 1100 is connected to or in communication with (collectively "connected to") the premises 1200, 1210, 1220, and 1230 via a coaxial cable network 1300, such as an HFC network, using taps 1400. Each of the premises 1200, 1210, 1220, and 1230 can include point of entry equipment 1500 which can be, but is not limited to, network interface devices (NIDs) and/or optical network terminals (ONTs), at a point of demarcation 1600. A passive noise dampener 1700 is connected between the tap 1400 and the point of entry equipment 1500 at the point of demarcation 1600. Customer premises equipment (CPE) can be connected to the point of entry equipment 1500. The CPE can be, but is not limited to, end user devices, set-top boxes, personal computers (PCs), cellular telephones, Internet Protocol (IP) devices, computers, desktop computers, laptops, mobile devices, handheld computers, PDAs, personal media devices, smartphones, notebooks, notepads, phablets and the like which can be connected to the cable modem 1210, for example.

The number of taps 1400, the number of premises, and the number of passive noise dampeners 1700 is illustrative. The communications between elements or components in the network 1000 can include wired communications, wireless communications, or a combination thereof, as appropriate. The network 1000 and each element or component in the network 1000 is illustrative and can include additional, fewer or different devices, entities, element, components, and the like which can be similarly or differently architected without departing from the scope of the specification and claims herein. Moreover, the illustrated devices, entities, element, and components can perform other functions without departing from the scope of the specification and claims herein.

Figure 2:
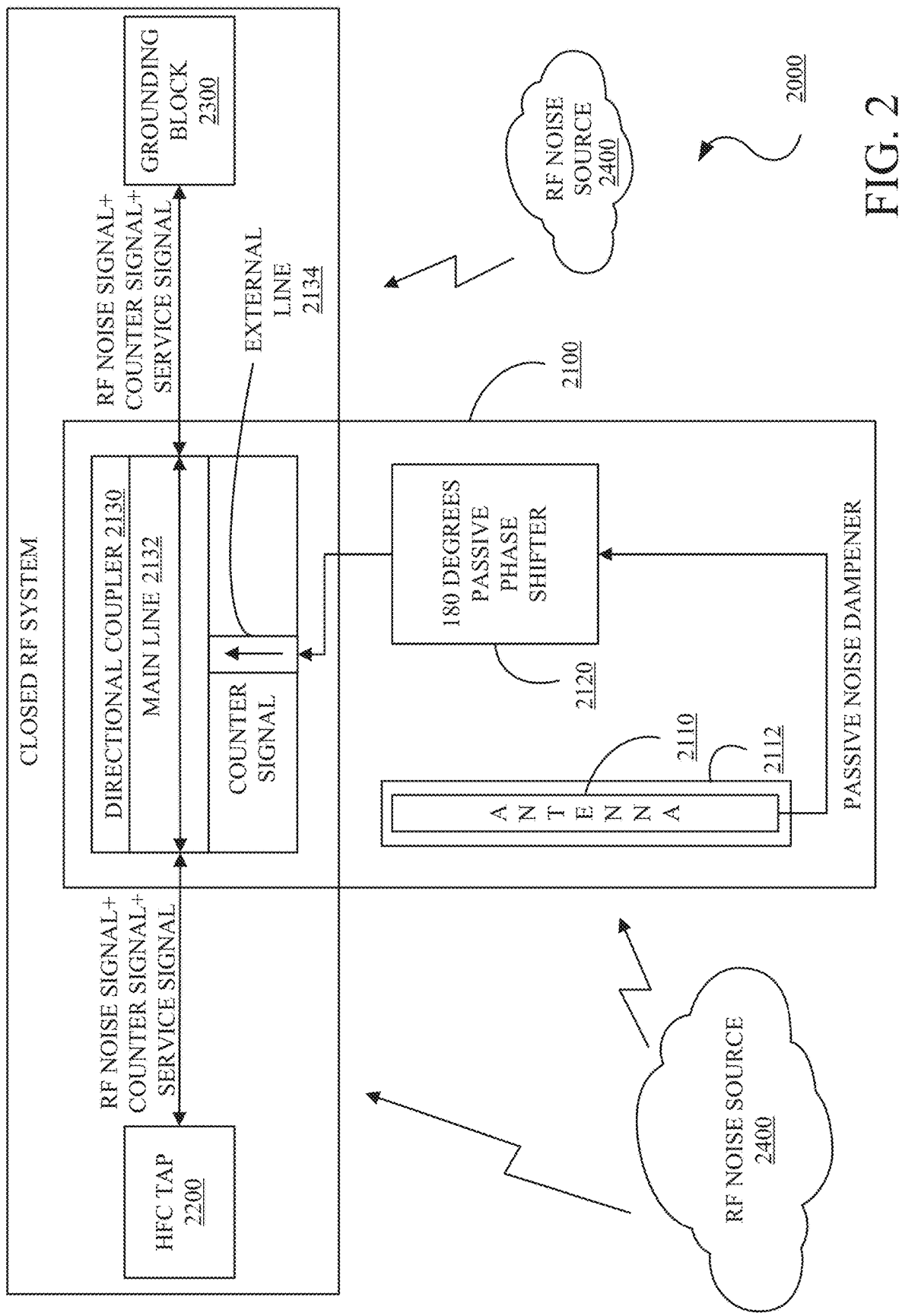
FIG. 2 is a block diagram of a system with a passive noise dampener in accordance with embodiments of this disclosure.

FIG. 2 is a block diagram of an example system 2000 with a passive noise dampener 2100 in accordance with embodiments of this disclosure. In implementations, the system 2000 can include a HFC tap 2200 which can be connected to a HFC network (such as the coaxial cable network 1300 shown in FIG. 1) and to the passive noise dampener 2100, which in turn can be connected to a grounding block 2300 located at a point of demarcation. A service provider can provide cable, television, Internet, voice, and like services to premises associated with the grounding block 2300 via the HFC tap 2200, the passive noise dampener 2100, and the grounding block 2300.

The passive noise dampener 2100 can include an antenna 2110 connected to a 180 degrees passive phase shifter 2120, which in turn is connected to a passive directional coupler 2130. The antenna 2110 can consist of the same medium as the coaxial cable system in order to receive the RF or wireless signals at the same values penetrating the HFC network. That is, a core or body of the antenna can be coaxial cable, which can be copper plated aluminum, for example. The antenna 2110 or the core can be wrapped in a dielectric 2112 to prevent a short circuit. The antenna is a zero gain antenna. In implementations, the 180 degrees passive phase shifter 2120 can consist of two quadrature passive phase shifters linked in a series in order to phase shift the received signal 180 degrees. The directional coupler 2130 can include a main line 2132 which permits transmission of signals between the HFC tap 2200 and the grounding block 2300, and an external line which permits a counter signal to be combined with a RF noise signal and service signal but prevents transmission of the combined signal from emitting out via the antenna 2110. The passive noise dampener 2100 does not include any active and/or powered components.

Figure 3:
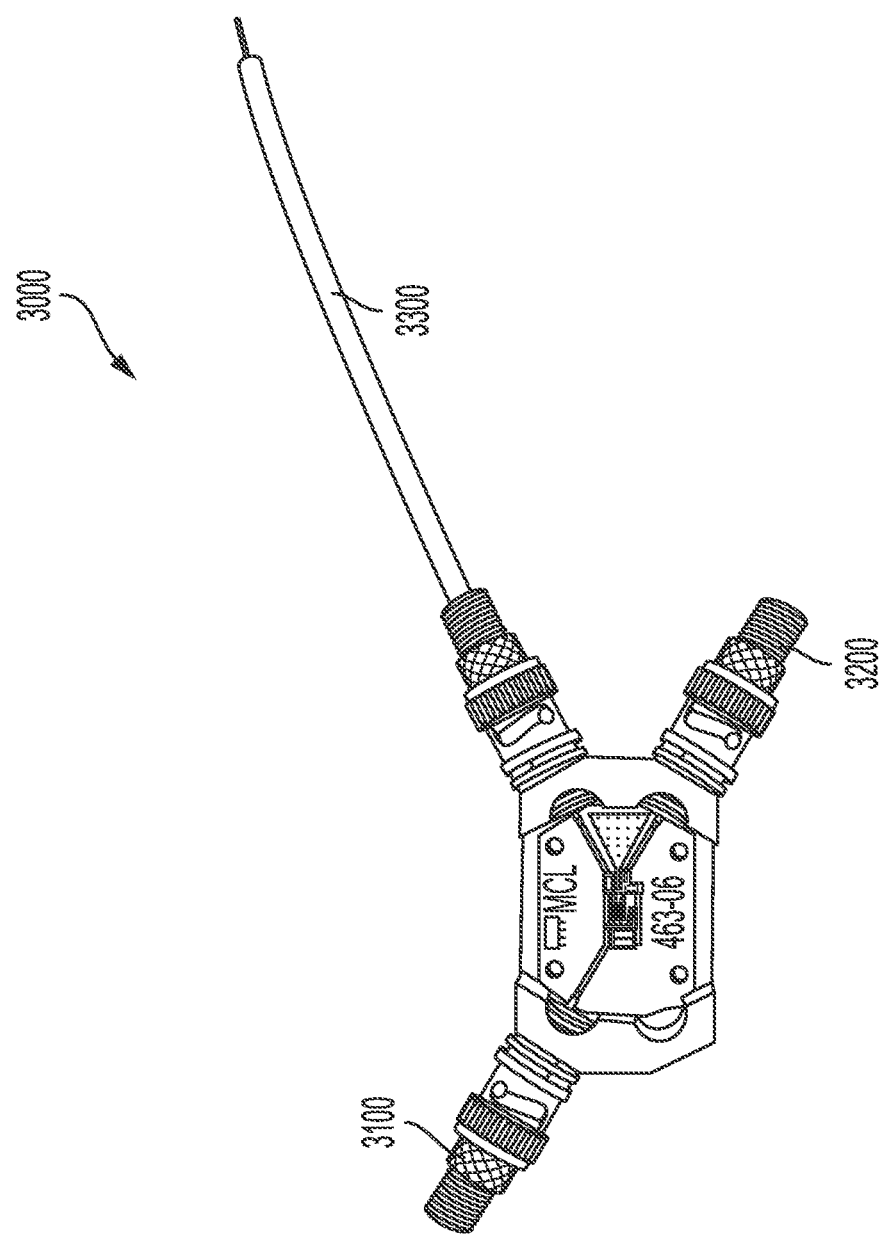
FIG. 3 is a photograph of an example passive noise dampener in accordance with embodiments of this disclosure.

FIG. 3 is a photograph of an example passive noise dampener 3000 in accordance with embodiments of this disclosure. The passive noise dampener 3000 has two coaxial cable connectors 3100 and 3200 and an antenna 3300 as described herein. One of the coaxial cable connectors 3100 and 3200 can be connected to a tap such as the HFC tap 2200 and another of the coaxial cable connectors 3100 and 3200 can be connected to a grounding block at a point of demarcation such as the grounding block 2300.

Ideally, the network 1000 and system 2000 are closed RF systems. That is, RF or wireless signals do not leak into or out of (not broadcasting) the network 1000 and system 2000. However, RF or wireless noise or interference signals ("RF noise signals") such as from RF or wireless noise sources 1800 and mobile device 1900 in FIG. 1 or RF or wireless noise sources 2400 in FIG. 2 do leak into the network 1000 and system 2000. The RF or wireless noise signals can be received by elements or components proximate the point of demarcation 1600, for example, including for example, the point of entry equipment 1500, the grounding block 2300, couplers, splitters, and the CPEs. This leakage into the network 1000 and system 2000 of RF or wireless noise signals can cause loss or degradation of services as the RF or wireless noise signals interferes with service signals transmitted between the CMTS 1100 and the premises 1200, 1210, 1220, and 1230 in FIG. 1 or as between the HFC tap 2200 and the grounding block 2300 in FIG. 2. For example, the quality, signal-to-noise ratios, and/or other signal metrics of the service signals can be degraded.

Operationally, service provider system signals, subscriber signals, and/or service signals (collectively "service signals") can be transmitted between the service provider system 1050 and the premises 1200, 1210, 1220, and 1230 or the HFC tap 2200 and the grounding block 2300. In non-ideal environments, the RF noise signals combine with the service signals resulting in service signal degradation. The passive noise dampener 2100 can provide a mechanism for intentionally injecting a lower amplitude complementary into the system 2000 to counteract the RF noise signals.

The passive noise dampener 2100 can generate and combine a counter signal with the service signal and the RF noise signals to lessen the impact of the RF noise signal. The antenna 2110 can receive the same RF noise signals, for example from RF noise source 2400, as the rest of the system 2000. The received RF noise signal can then be phase shifted 180 degrees by the 180 degrees passive phase shifter 2120 to generate a counter signal. The counter signal can progress to the direction coupler 2130 using via the external line 2134 and the main line 2132, where the directional coupler 2130 can combine or inject the counter signal with the service signal and the RF noise signal. As noted, the service signal can be from the service provider or the premise. As the received RF noise signal travels through or progresses from the antenna 2110 to the directional coupler 2130, the amplitude of the counter signal is decreased relative to the RF noise signal received by the antenna or the rest of the system 2000. For example, the decrease can be −10 dB. Since the counter signal is 180 degrees out-of-phase with the RF noise signal and of a lesser amplitude, the interference resulting from the RF noise signal is decreased.

The localized passive phase shifters lessen the impact of interference caused by constant RF noise signals and by impulse or burst RF noise signals at each premise. In addition, the cumulative effect of the passive phase shifters at each premise can contribute to an overall system wide decrease in service signal degradation.

Figure 4:
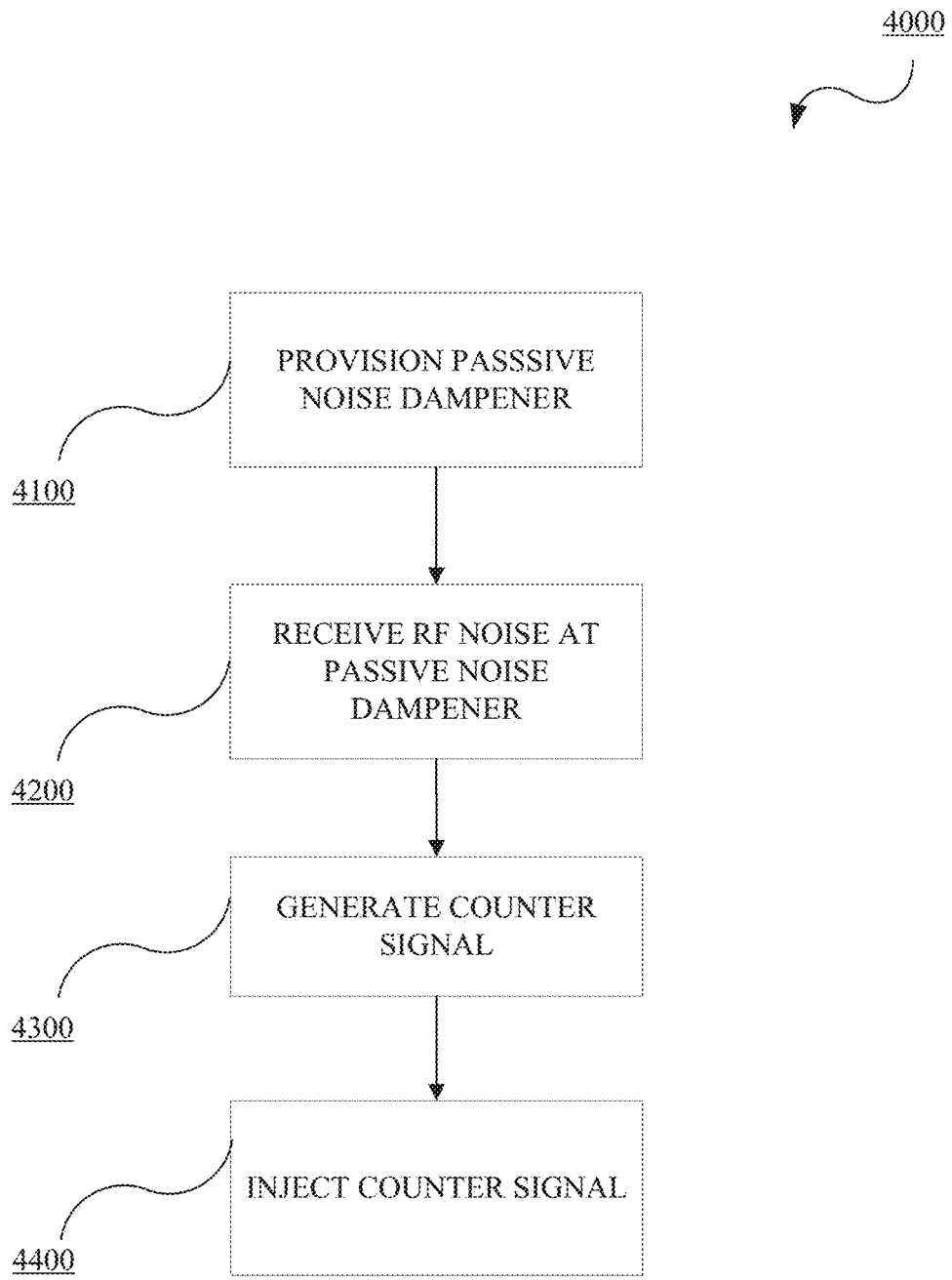
FIG. 4 is a flowchart of an example method for passive noise dampening in accordance with embodiments of this disclosure.

FIG. 4 is a flowchart of an example method 4000 for passive noise dampening in accordance with embodiments of this disclosure. The method 4000 includes: provisioning 4100 a passive noise dampener for premises connected to a coaxial cable system; receiving 4200 a RF noise signal at the passive noise dampener; generating 4300 a counter signal from the received RF noise signal; and injecting 4400 the counter signal with a RF noise signal received by the coaxial cable system to mitigate impact on service signal. For example, the method 4000 may be implemented, as applicable and appropriate, by the network 1000 and components therein including the passive noise dampener 1700, the network 2000 and components therein including the passive noise dampener 2100, and the passive noise dampener 3000.

The method 4000 includes provisioning 4100 a passive noise dampener for premises connected to a coaxial cable system. A service provider can use a HFC network to connect to multiple premises. Each such premise can be provisioned with a passive noise dampener at a point of demarcation at the premise. In implementations, the passive noise dampener can be connected between a tap and a grounding block. The passive noise dampener can include two coaxial cable connector ports for connecting to each of the tap and the grounding block.

The method 4000 includes receiving 4200 a RF noise signal at the passive noise dampener. The passive noise dampener can include an antenna constructed from the same material as the HFC network. The antenna can pick up RF noise signals from RF noise sources in the same manner that the HFC network and components near the point of demarcation are picking up RF noise signals. That is, RF noise signals that are local to the provisioned passive noise dampener are picked up.

The method 4000 includes generating 4300 a counter signal from the received RF noise signal. The passive noise dampener can include an inverter to generate the counter signal. The inverter can change the phase of the received RF noise signal by 180 degrees. That is, the counter signal is a complementary signal.

The method 4000 includes injecting 4400 the counter signal with a RF noise signal received by the coaxial cable system to mitigate impact on service signal. The passive noise dampener can include a passive directional coupler to inject or combine the counter signal with a service signal and a system received RF noise signal. The amplitude of the counter signal is less than the amplitude of the received RF noise signal or the system received RF noise signal since the amplitude of the received RF noise signal decreases after passing through the passive components such as antenna, the inverter, and the directional coupler. Consequently, the intentional introduction of the counter signal decreases the interference caused by the system received RF noise signal. The cumulative effect of each of the passive noise dampeners decreases the overall effect of RF noise signals on the network.

Described herein is a system including a hybrid fiber-coaxial network configured to carry content signals between a service provider system and premises, the hybrid fiber-coaxial network susceptible to receiving wireless noise signals, and a plurality of passive noise dampeners, each passive noise dampener connected between the hybrid fiber-coaxial network and a premise of the premises. Each passive noise dampener includes an antenna based on medium used in the hybrid fiber-coaxial network, the antenna configured to receive the wireless noise signals, a phase shifting device configured to 180 degrees phase shift the wireless noise signals received by the antenna to generate a counter signal, and a directional coupler configured to inject the counter signal into the hybrid fiber-coaxial network to mitigate impact of the wireless noise signals received by the hybrid fiber-coaxial network on the content signals, wherein the antenna, the phase shifting device, and the directional coupler are passive devices.

In the system, the amplitude of the counter signal is less than an amplitude of the wireless noise signals received by the antenna.

In the system, the antenna further includes a core constructed from the medium and a dielectric wrapping the core.

In the system, the phase shifting device further includes a first quadrature phase shifter configured to phase shift the wireless noise signals received by the antenna and a second quadrature phase shifter configured to phase shift the quadrature phase shifted wireless noise signals to generate the counter signal. In the system, the phase shifting device further includes serially coupled 90 degree phase shifting devices.

In the system, the directional coupler is further configured to prevent emission via the antenna.

The system further includes one or taps configured to connect to the hybrid fiber-coaxial network and a passive noise dampener from the passive noise dampeners and a grounding block configured to connect to the passive noise dampener and a point of entry device at the premise.

Described herein is a passive noise dampener which includes an antenna configured to receive radio frequency signals from radio frequency sources, the received radio frequency signals compatible with radio frequency signals received by a service provider coaxial cable network, wherein the antenna is constructed from coaxial cable, a passive phase shifter configured to shift a phase of the antenna received radio frequency signals to generate a complementary signal, and a direction coupler configured to combine the complementary signal with service provider signals and the service provider coaxial cable network received radio frequency signals, wherein the complementary signal mitigates the impact of the service provider coaxial cable network received radio frequency signals on the service provider signals.

In the passive noise dampener, the amplitude of the complementary signal is less than an amplitude of the service provider coaxial cable network received radio frequency signals.

In the passive noise dampener, a core of the antenna is constructed from coaxial cable and includes a dielectric wrapping the core.

In the passive noise dampener, the complementary signal is 180 degrees out of phase with the antenna received radio frequency signals.

In the passive noise dampener, the passive phase shifter further includes a first quadrature phase shifter configured to phase shift the antenna received radio frequency signals and a second quadrature phase shifter configured to phase shift the quadrature phase shifted received radio frequency signals to generate the complementary signal. In the passive noise dampener, the passive phase shifter further comprising serially coupled 90 degree phase shifters.

In the passive noise dampener, the directional coupler is configured to prevent emission via the antenna.

Described herein is a method for passively noise dampening. The method includes receiving interfering radio frequency noise signals by a coaxial cable network carrying service signals between a service provider and subscriber premises, provisioning passive noise dampeners between the service provider and the subscriber premises, receiving, by each antenna of a passive noise dampener, interfering radio frequency noise signals local to the passive noise dampener, generating, by a passive phase shifter of the passive noise dampener, a counter signal from the locally received interfering radio frequency noise signals, and combining, by a directional coupler of the passive noise dampener into the coaxial cable network, the counter signal with the received interfering radio frequency noise signals by a coaxial cable network and the service signals to mitigate impact on the service signal.

In the method, the counter signals corresponding to each of the passive noise dampeners cumulatively lessens the impact of the interfering radio frequency noise signals received by the coaxial cable network on respective service signals carried by the coaxial cable network.

In the method, the amplitude of a respective counter signal is less than an amplitude of respective interfering radio frequency noise signals received by a respective antenna.

In the method, each antenna is constructed from coaxial cable and includes a dielectric wrapping the core.

In the method, respective counter signals are 180 degrees out of phase with respective interfering radio frequency noise signals received by a respective antenna.

The method further includes connecting each of the passive noise dampeners between a tap on the coaxial cable network and a grounding block at a point of demarcation at respective subscriber premises.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A system comprising:
   a transmission cable configured to carry content signals between a service provider system and a premises, the transmission cable susceptible to receiving noise signals which impact the content signals;
   a passive noise dampener connected between the transmission cable and the premises, the passive noise dampener comprising:
   an antenna configured to receive the noise signals;
   a phase shifting device configured to phase shift the noise signals received by the antenna to generate a counter signal; and
   a directional coupler configured to inject the counter signal into the transmission cable to mitigate the impact of the noise signals.

2. The system of claim 1, wherein an amplitude of the counter signal is less than an amplitude of the noise signals received by the antenna.

3. The system of claim 1, wherein the antenna is based on the transmission cable.

4. The system of claim 1, wherein the phase shifting device further comprising:
   a first quadrature phase shifter configured to phase shift the noise signals received by the antenna; and
   a second quadrature phase shifter configured to phase shift the quadrature phase shifted noise signals to generate the counter signal.

5. The system of claim 1, wherein the phase shifting device further comprising serially coupled 90 degree phase shifting devices.

6. The system of claim 1, wherein the directional coupler further configured to prevent emission via the antenna.

7. The system of claim 1, further comprising:
   a tap configured to connect to the transmission cable and the passive noise dampener; and a grounding block configured to connect to the passive noise dampener and a point of entry device at the premises.

8. A passive noise dampener, comprising:

an antenna configured to receive radio frequency signals from radio frequency sources, the received radio frequency signals compatible with radio frequency signals received by a transmission line medium;

a passive phase shifter configured to generate a complementary signal by phase shifting the antenna received radio frequency signals; and a direction coupler configured to combine the complementary signal with service signals and the transmission line medium received radio frequency signals, wherein the complementary signal mitigates the impact of the transmission line medium received radio frequency signals on the service signals.

9. The passive noise dampener of claim 8, wherein an amplitude of the complementary signal is less than an amplitude of the transmission line medium received radio frequency signals.

10. The passive noise dampener of claim 8, wherein the antenna is constructed from the transmission line medium.

11. The passive noise dampener of claim 8, wherein the complementary signal is 180 degrees out of phase with the antenna received radio frequency signals.

12. The passive noise dampener of claim 8, wherein the passive phase shifter further comprising:

a first quadrature phase shifter configured to phase shift the antenna received radio frequency signals; and a second quadrature phase shifter configured to phase shift the quadrature phase shifted received radio frequency signals to generate the complementary signal.

13. The passive noise dampener of claim 8, wherein the passive phase shifter further comprising serially coupled 90 degree phase shifters.

14. The passive noise dampener of claim 8, wherein the directional coupler configured to prevent emission via the antenna.

15. A method for passively noise dampening, the method comprising:

receiving interfering noise signals by a cable network carrying service signals between a service provider and subscriber premises;

connecting a passive noise dampener between the service provider and each subscriber premises;

receiving, by each antenna of a connected passive noise dampener, interfering noise signals local to the passive noise dampener;

generating, by a passive phase shifter of the connected passive noise dampener, a counter signal from the locally received interfering noise signals; and combining, by a directional coupler of the connected passive noise dampener into the cable network, the counter signal with the received interfering noise signals of the cable network and the service signals to mitigate impact on the service signals.

16. The method of claim 15, wherein a counter signal corresponding to each connected passive noise dampener cumulatively lessens the impact of the interfering noise signals received by the cable network on respective service signals carried by the cable network.

17. The method of claim 15, wherein an amplitude of a respective counter signal is less than an amplitude of respective interfering noise signals received by a respective antenna.

18. The method of claim 15, wherein each antenna is constructed from a medium of the cable network.

19. The method of claim 15, wherein respective counter signals are 180 degrees out of phase with respective interfering noise signals received by a respective antenna.

20. The method of claim 15, further comprising:

connecting each passive noise dampener between a tap on the cable network and a grounding block at a point of demarcation at respective subscriber premises.

* * * * *